United States Patent
Wulc et al.

[11] Patent Number: 5,257,720
[45] Date of Patent: Nov. 2, 1993

[54] GASOLINE BLENDING AND DISPENSING SYSTEM

[75] Inventors: Stanley S. Wulc, Rydal, Pa.; Larry M. Bateman, Redmound, Wash.

[73] Assignee: Gasboy International, Inc., Lansdale, Pa.

[21] Appl. No.: 811,546

[22] Filed: Dec. 20, 1991

[51] Int. Cl.$^5$ .............................................. B67D 5/30
[52] U.S. Cl. ........................................ 222/20; 222/29; 222/59; 222/71; 222/135; 222/145; 251/129.11; 251/180; 251/208
[58] Field of Search ................... 222/14, 17, 20, 22, 222/25, 26, 27, 28, 52, 59, 71, 72, 73, 129, 135, 145; 364/465; 251/129.11, 180, 208, 286

[56] References Cited

U.S. PATENT DOCUMENTS

| | | | |
|---|---|---|---|
| 3,047,011 | 7/1962 | Wright et al. | 137/490 |
| 3,749,283 | 7/1973 | Nelson | 228/27 |
| 3,847,302 | 11/1974 | Krone et al. | 222/14 |
| 3,946,900 | 3/1976 | DiBrueler | 222/14 X |
| 4,032,042 | 6/1977 | Piat | 222/20 |
| 4,060,178 | 11/1977 | Miller | 222/14 |
| 4,230,937 | 10/1980 | Smilgys | 222/20 X |
| 4,360,127 | 11/1982 | Maruyama et al. | 222/14 |
| 4,397,405 | 8/1983 | Batson | 222/14 |
| 4,418,839 | 12/1983 | Nichols | 222/14 |
| 4,576,312 | 3/1986 | Swick | 222/27 |
| 4,876,653 | 10/1989 | McSpadden et al. | 222/26 X |
| 4,962,912 | 10/1990 | Stoll | 251/208 |
| 4,978,029 | 12/1990 | Furrow et al. | 222/26 X |
| 5,018,645 | 5/1991 | Zinsmeyer | 222/26 X |
| 5,038,971 | 8/1991 | Gayer et al. | 222/28 X |

FOREIGN PATENT DOCUMENTS 1086863  8/1954  France .............................. 251/180

Primary Examiner—Andres Kashnikow
Assistant Examiner—Joseph A. Kaufman
Attorney, Agent, or Firm—Paul & Paul

[57] ABSTRACT

A gasoline blending and dispensing system delivers a predetermined blend of low and high octane gasoline from low and high octane gasoline supply tanks to a nozzle for dispensing from the system. The system includes a valve responsive to valve control signals produced by a valve control for regulating the flows of the low and high octane gasolines for dispensing the predetermined blend.

28 Claims, 7 Drawing Sheets

5,257,720

GASOLINE BLENDING AND DISPENSING SYSTEM

BACKGROUND OF THE INVENTION

1. Field of the Invention

The present invention relates generally to fluid dispensing systems, and more particularly to dispensing systems for delivering predetermined blends of low and high octane gasolines.

2. Brief Description of the Prior Art

Various dispensing systems for delivering a blend of two or more fluid products are known.

Some systems incorporate a plurality of independently operable control valves in a blending system for regulating the relative amounts of each particular fluid in the blend. Each control valve may be preset to allow a particular fluid amount to pass into the system for obtaining the desired blended product. However, deficiencies in valve operation may result with an actual blend dispensed by the system that is slightly varied from the desired blend.

Some systems incorporate control valves operable by a microprocessor in order to enhance the accuracy of the actual blend dispensed by the system. However, such prior art systems do not compensate for the residual blend remaining in the system from the previous blending cycle In addition, the extent of blend accuracy attainable by the system is limited by the responsiveness of the particular control valves.

SUMMARY OF THE INVENTION

The present invention provides a gasoline blending and dispensing system for delivery of a predetermined blend of low and high octane gasoline from respective low and high octane gasoline supply sources. Valve means responsive to control signals are provided for regulating the flows of the low and high octane gasoline in order to deliver the predetermind blend.

Advantageously, the present invention provides a blending system capable of compensating for residual fluid remaining in the system for maintaining the desired blend.

It is a further advantage of the present invention to provide an improved valve for use in a blending system for controlling the desired blend and the fluid flow rate.

DETAILED DESCRIPTION

Generally, first and second valve means are provided for regulating the flows of the low and high octane gasoline from the respective low and high octane gasoline supply sources in response to first and second control signals. First and second meter means are provided for generating first and second flow rate signals relating to the rates of flow of the respective low and high octane gasolines. Dispensing means including a hollow delivery hose are provided for receiving the flows of the low and high octane gasolines for dispensing from the system. The hollow delivery hose contains a previous blend of low and high octane gasoline prior to receiving a new flow of the low and high octane gasoline. Means for producing a blend ratio signal is included in the system. The blend ratio signal is indicative of a ratio of low octane gasoline to high octane gasoline to be dispensed from the system.

Preferably, means for producing a residual blend ratio signal is also provided. The residual blend ratio signal relates to the ratio of low to high octane gasoline associated with the previous blend which is contained within the hollow delivery hose. A valve control means is provided which is responsive to the blend ratio signal, the residual blend ratio signal and the first and second flow rate signals. The valve control means produces the first and second control signals for adjusting the first and second valve means. The adjustments of the first and second valve means regulate the flows of the low and high octane gasoline in order to dispense the predetermined blend.

Preferably, the first and second valve means include a valve housing and a motor means. The motor means is responsive to the control signals provided from the valve control means. The valve housing is provided with an opening extending axially from the upper end to a valve base. An elongated shaft is associated with the motor means and extends within the opening in the housing. A closure is mounted to the elongated shaft for rotational movement with the elongated shaft. The elongated shaft is operatively driven in response to the control signals provided from the valve control means to the motor means. The valve base is provided with an inlet cavity which receives a flow of fluid and an orifice adjacent to the inlet cavity for discharging a flow of fluid. The closure is rotatable against the valve base and over the orifice in response to the control signals provided to the motor means to regulate the flow of fluid.

Figure 1:
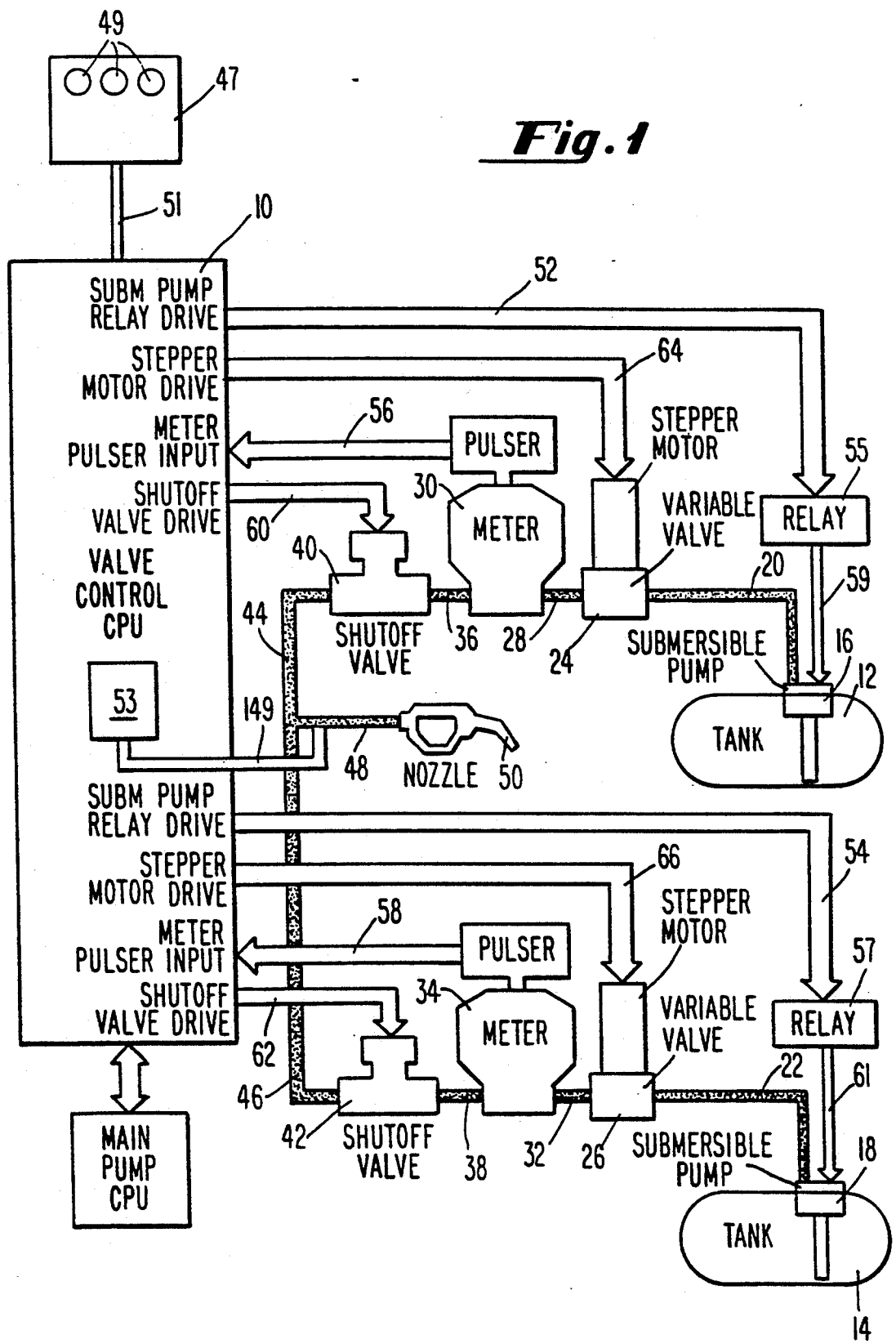
FIG. 1 is a block diagram of a blending and dispensing system according to the present invention.

Referring now to the drawings in detail, wherein like reference numerals indicate like elements throughout the several views, there is shown in the block diagram of FIG. 1 a blender valve control system according to the present invention. The illustrative system includes a valve control 10, first and second tanks 12 and 14 for storing first and second fluids, respectively, first and second submersible pumps 16 and 18 for pumping the first and second fluids from the tanks 12 and 14, through first and second inlet lines 20 and 22, to first and second variable valves 24 and 26, respectively, the first variable valve 24 for varying the rate of flow of the first fluid and the second variable valve 26 for varying the rate of flow of the second fluid, a first connecting line 28 for delivering the first fluid from the first variable valve 24 to a first meter 30, the first meter 30 producing a signal according to the rate of flow of the first fluid through the first meter 30, a second connecting line 32 for delivering the second fluid from the second variable valve 26 to a second meter 34, the second meter 34 producing a signal according to the rate of flow of the second fluid through the second meter 34, first and second coupling lines 36 and 38 for delivering the first and second fluids from the meters 30 and 34 to first and second shut-off valves 40 and 42, respectively, the first and second shut-off valves 40 and 42 preventing the passage of the respective first and second fluids, first and second delivery lines 44 and 46 connected to the shut-off valves 40 and 42 for delivering the first and second fluids to a hollow outlet delivery hose 48, and a nozzle 50 connected to the outlet delivery hose 48 for dispensing the blended fluid.

In a presently preferred embodiment of the invention, the first and second fluids comprise a low (lower) octane gasoline and a high (higher) octane gasoline, respectively. A blend control 47 having a plurality of blend selection switches 49 is connected to the valve control 10, via line 51, for selecting a particular grade of gasoline derived from a blend of the low octane gasoline and the high octane gasoline for dispensing from the nozzle 50. The blend selection switches allow an operator to select any desired grade of gasoline which has been input within the blend control 47 in relation to a particular transaction.

A visual display (not shown) may also be connected to the valve control 10 for displaying various data produced from the system. For example, information relating to price and unit volume may be displayed in relation to a particular grade of gasoline selected to be dispensed from the system.

The valve control 10 may comprise any type of microprocessor commonly known in the industry for providing control signals for operating various external systems in response to specified information input within the device. The valve control 10 includes a rom 53 for storing data, via line 149, relating to a previous blend of first and second fluids remaining in the hollow outlet delivery hose 48.

Submersible pump relay drive control signals are carried from the valve control 10 by lines 52 and 54 to the first and second relays 55 and 57, respectively, which are in turn connected by lines 59 and 61 to submersible pumps 16 and 18 for actuating the pumping of the first and second fluids from tanks 12 and 14.

Pulser signals relating to the flow of the first and second fluids are carried from the first and second meters 30 and 34, respectively, by lines 56 and 58 to the valve control 10. In a presently preferred embodiment, each pulser signal received by the valve control 10 indicates a specific volume of fluid which has passed through the meters 30 and 34.

The meters 30 and 34 may comprise any type of meter commonly known in the industry for producing pulse signals indicative of a rate of flow through the meter.

Figure 2:
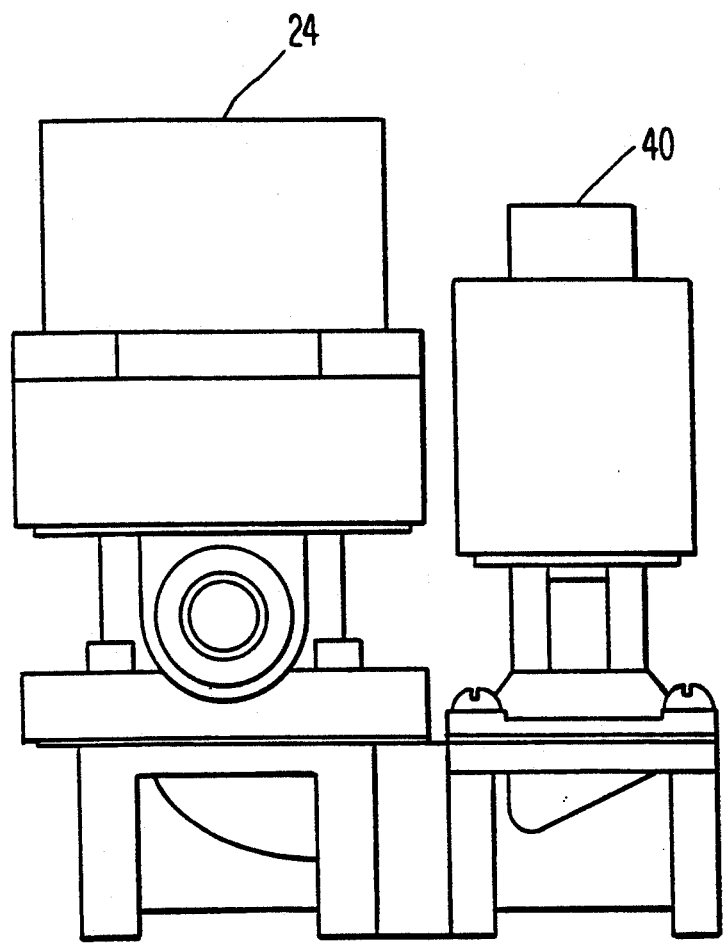
FIG. 2 is a perspective view of the variable valve and shut-off valve of the system shown in FIG. 1.

Shut-off valve drive control signals are connected from the valve control 10 by lines 60 and 62 to the first and second shutoff valves 40 and 42, respectively, for preventing the passage of the first and second fluids. As shown in FIG. 2, the shut-off valves 40 and 42 (only one of which is visible in FIG. 2) comprise a solenoid connected in series between the variable valves 24 and 26 (only one of which is visible in FIG. 2) and a nozzle 50 (not shown). The solenoid may comprise any type of solenoid known in the industry for functioning as a shut-off valve in response to pulse signals input within the device.

As illustrated in FIG. 1, stepper motor drive control signals are carried from the valve control 10 by lines 64 and 66 to the first and second variable valves 24 and 26, respectively, for varying the rates of flow of the first and second fluids.

Figure 3:
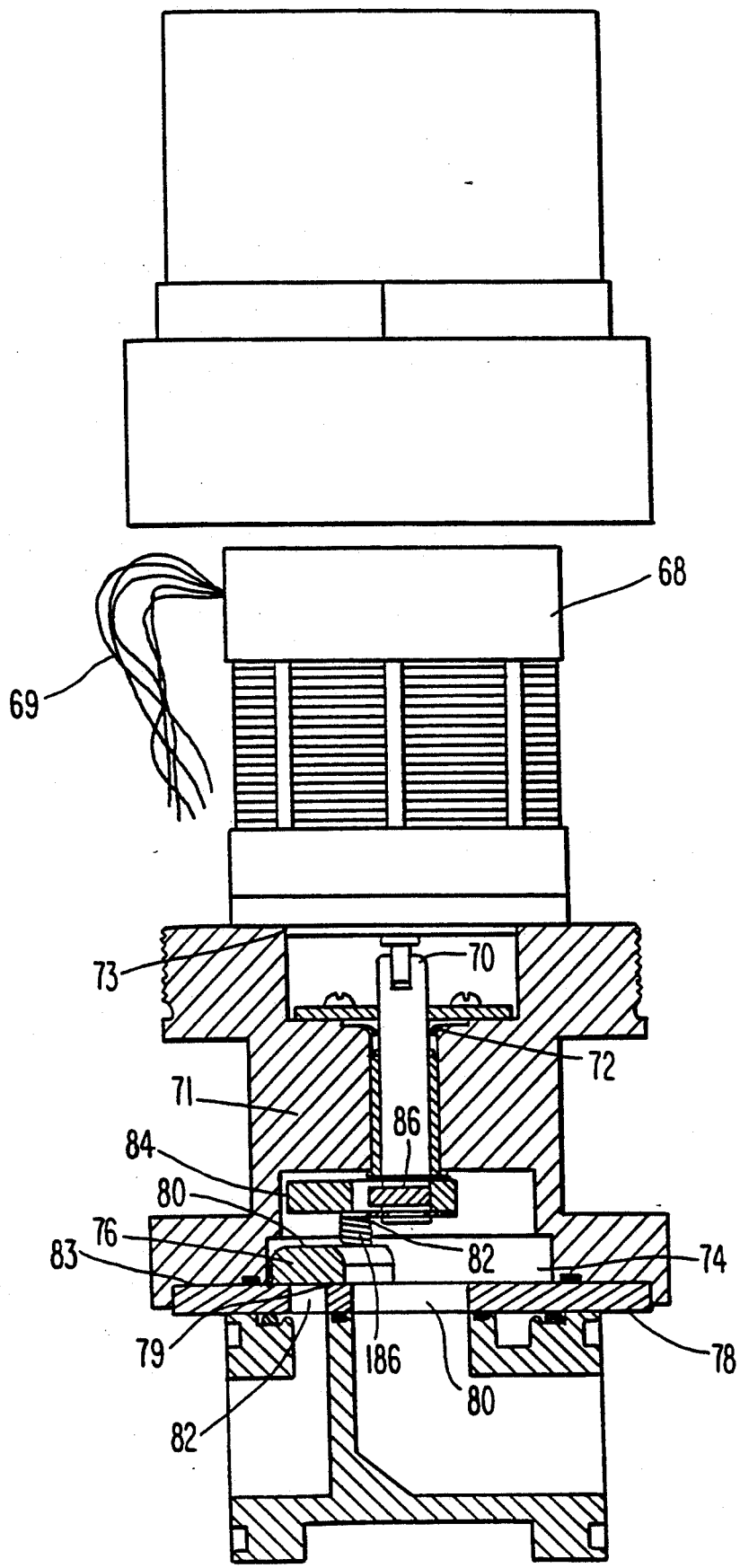
FIG. 3 is a fragmentary sectional elevational view of the variable valve of FIG. 2.

The variable valves 24 and 26 according to the present invention are illustrated in the fragmentary sectional elevational view of FIG. 3. Each of the variable valves 24 and 26 includes a stepper motor 68 connected to an upper portion 73 of a valve housing 71. The stepper motor 68 is responsive to the particular stepper motor drive control signal, by lines 69, for controlling a rotatable shaft 70. The rotatable shaft 70 extends axially downward through a substantially cylindrical bore 72 formed in the valve housing 71, into the substantially cylindrical housing cavity 74, for rotating a closure 76 either clockwise or counterclockwise against a valve base 78.

In a presently preferred embodiment, the closure 76 comprises a wiper blade, however, the closure 76 may comprise any suitable closure. The closure 76 is an elongated member which includes a lower surface 79 and a substantially convex upper surface 80. Upper surface 80 is provided with a pair of notches (not shown) for receiving a corresponding pair of pins 82 (only one of which is visible in FIG. 3) which extend perpendicularly downward from a substantially semicircular disk 84. The Disk 84 is provided with a through hole 86 formed therein for mounting to the shaft 70. A pair of compression springs 186 (only one of which is visible in FIG. 3) are received by the pins 82 to urge the closure 76 axially downward against the valve base 78.

Figure 4:
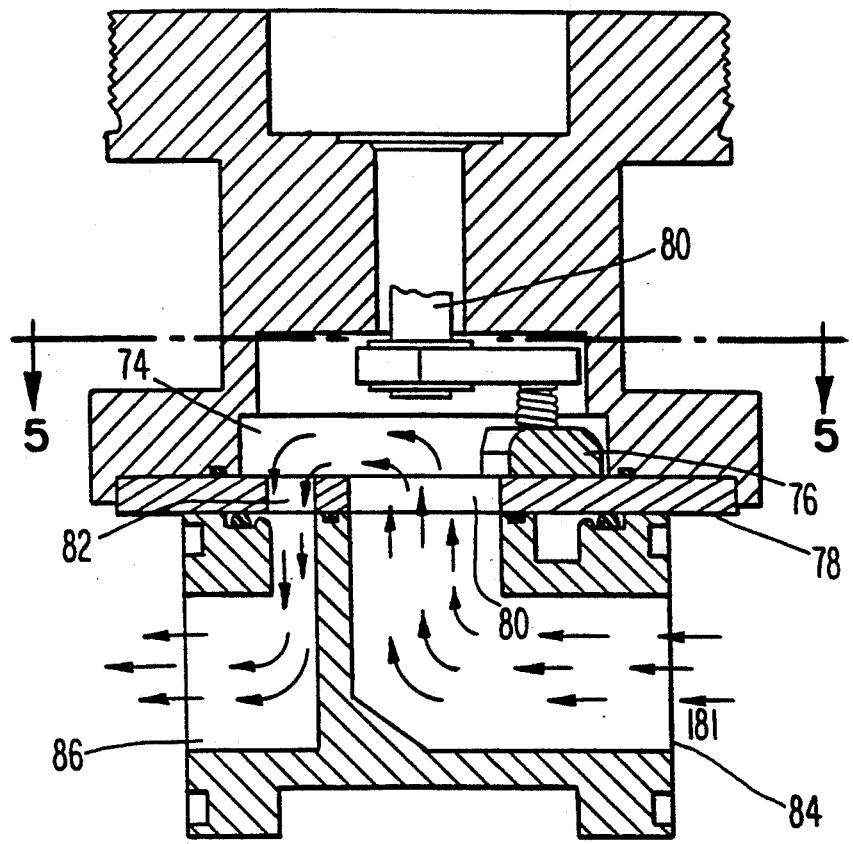
FIG. 4 is a fragmentary sectional view of the variable valve of FIG. 3 taken along the line 4—4 of FIG. 5 and shown in an opened position.
Figure 5:
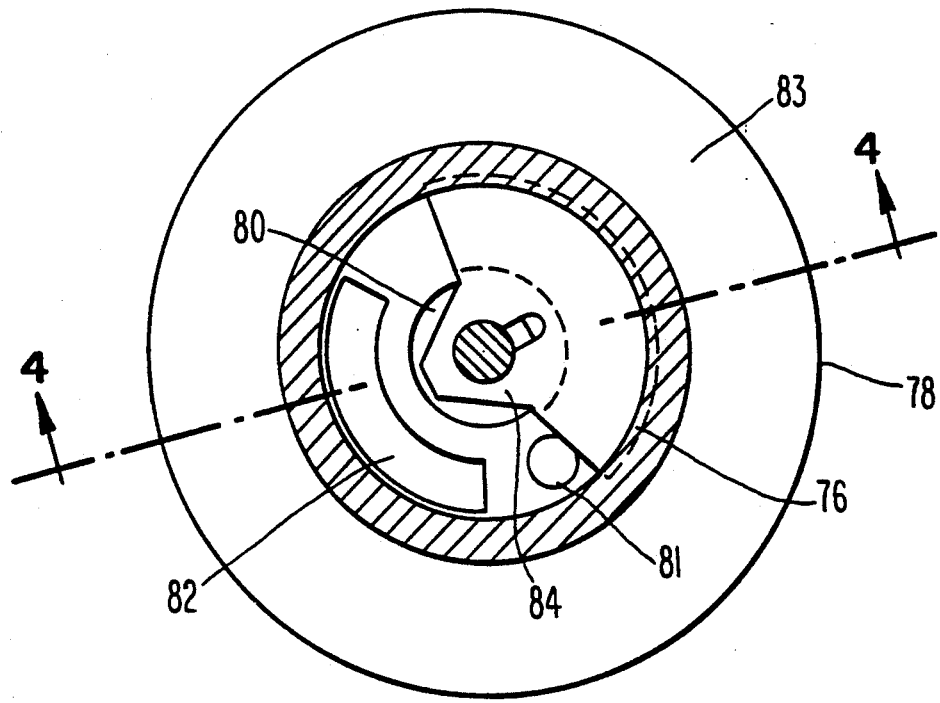
FIG. 5 is a sectional plan view of the variable valve of FIG. 4 taken along the line 5—5.
Figure 6:
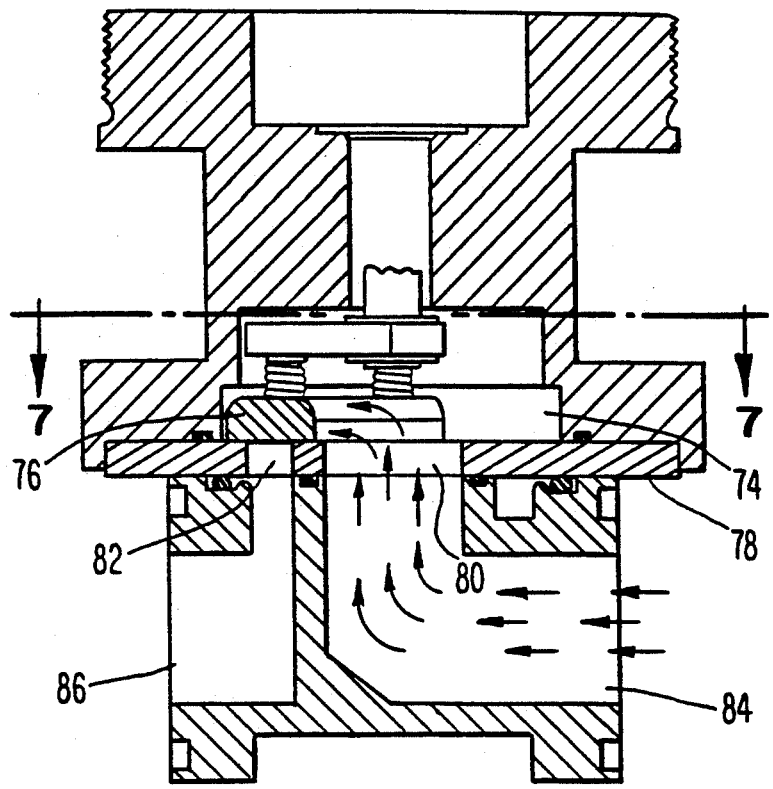
FIG. 6 is a fragmentary sectional view of the variable valve of FIG. 3 taken along line 6—6 of FIG. 7 and shown in a closed position.
Figure 7:
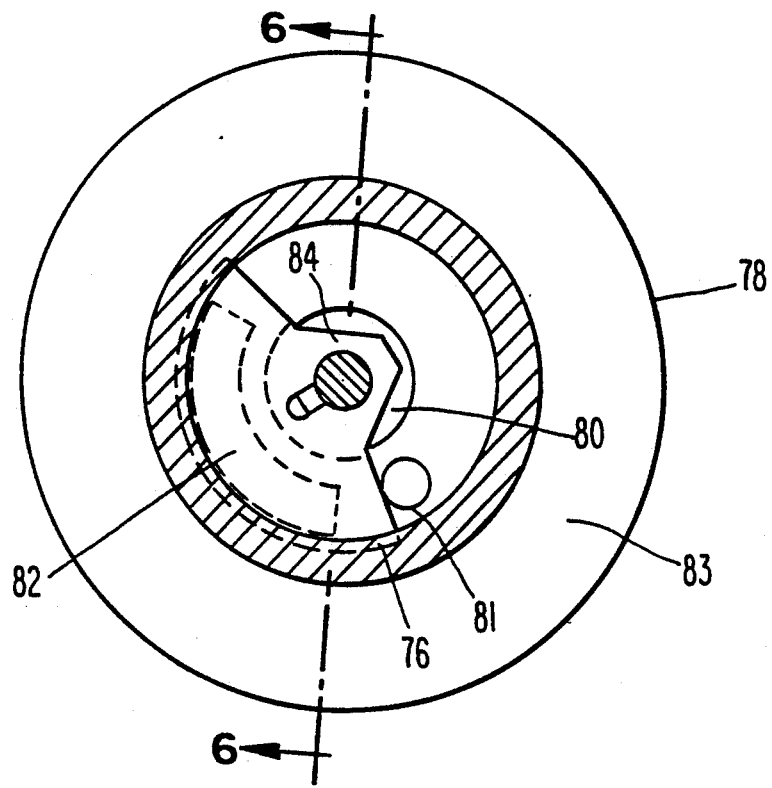
FIG. 7 is a sectional view of the variable valve of FIG. 6 taken along the line 7—7.

As shown in FIGS. 3 and 5, the valve base 78 includes a cylindrical inlet cavity 80 provided centrally therethrough, a substantially elongated orifice 82 formed therethrough adjacent the inlet cavity 80, an upper surface 83, and a substantially cylindrical closure stop 81 extending axially outward from the upper surface 83. As illustrated in phantom in FIGS. 5 and 7, the closure stop 81 restricts the clockwise and counterclockwise rotation of the closure 76 against the valve base 78. As shown in FIGS. 4 and 5, when the variable valves 24 and 26 are fully opened, the closure 76 is rotated to the extreme clockwise position engaging the closure stop 81 in order to allow fluid to flow in the direction of arrows 181, into an inlet 84, through the cylindrical inlet cavity 80, into the housing cavity 74, and out through the orifice 82 for discharging from an outlet 86. Accordingly, the closure 76 is rotatable by the shaft 70 to close-off the orifice 82 a specified amount for obtaining a specific flow rate of fluid out from the outlet 86. As shown in FIGS. 6 and 7, when the variable valve is fully closed, the closure 76 is rotated to the extreme counterclockwise position engaging the closure stop 81 to completely close-off the orifice 82 for preventing the passage of fluid into the outlet 86.

The stepper motor drive control signals applied to the stepper motor 68 are pulse signals which control the opening and closing of the variable valves 24 and 26 through the rotational adjustment of the closure 76, for obtaining the desired flow of fluid through each particular variable valve.

In a presently preferred embodiment, each pulse signal transmitted from the valve control 10 to the variable valves 24 and 26 adjusts the particular valve one step, with each step corresponding to approximately 1.8° of rotation. The pulse signals applied to the valves of the present invention are pulse width modulated having pulse widths of either 6, 8 or 10 milliseconds depending upon the amount of adjustment for the valve. The last 30 pulse signals of valve adjustment require longer pulse widths because of the presence of additional torque. Accordingly, adjustments of less than 30 steps require a pulse width in each position of 10 milliseconds, while adjustments greater than 30 steps require a pulse width of 10 milliseconds the first step, 8 milliseconds the second step, 6 milliseconds for steps 3 through n minus 30, where n is the number of steps of valve adjustment, 8 milliseconds for step n minus 29, and 10 milliseconds for the remaining steps.

The total number of steps required to move the variable valves 24 and 26 is based upon the desired flow rate and blend in relation to each of the first and second fluids, respectively. The valve control 10 adjusts each variable valve a total number of steps according to the total blend adjustments and flow adjustments in relation to each of the first and second fluids.

In a presently preferred embodiment, the variable valves 24 and 26 are adjustable during three different phases of a transaction. In transitional periods, from a slow flow to a fast flow, or, from a fast flow down to a slow flow, blend adjustments are applied to both variable valves 24 and 26 in opposite directions, and flow rate adjustments are applied to both variable valves 24 and 26 in the same direction. During constant flow in the middle of a transaction, blend adjustments are applied to both valves 24 and 26 in opposite directions, and flow rate adjustments are applied to the variable valve with a positive blend adjustment. Accordingly, the valve control 10 adjusts each valve every X pulses where X is the flow rate. In a presently preferred embodiment, the flow rates range from 3 gallons per minute to 15 gallons per minute. When flow is initiated in the beginning of a transaction, the flow rate starts at 3 gallons per minute and increases linearly to 15 gallons per minute in about 2 seconds. When a flow is terminated at the end of a transaction, the rate is slowed from 15 gallons per minute to 5 gallons per minute in about two seconds. Accordingly, the valve control 10 continuously calculates the amount of blended fluid that would be delivered at the current flow rate before slow flow could be reached. When the actual delivery reaches the estimated valve, the valve control 10 decreases the flow to slow flow.

Whenever there are no pulses detected for 0.4 seconds in slow flow, or 0.15 seconds in fast flow, the motor adjusts the variable valve 24 and 26 initially to the closed position, and then to a minimum flow position. Accordingly, calibration of the system determines the valve positions for minimum flow and the flow rates for slow flow. In a presently preferred embodiment, the slow flow rate is one third the maximum flow rate at calibration. For example, the slow flow rate may be calculated at 3 gallons per minute, and the maximum flow rate at 9 gallons per minute, where the pulse rate is 1000 pulses per gallon.

Figure 8:
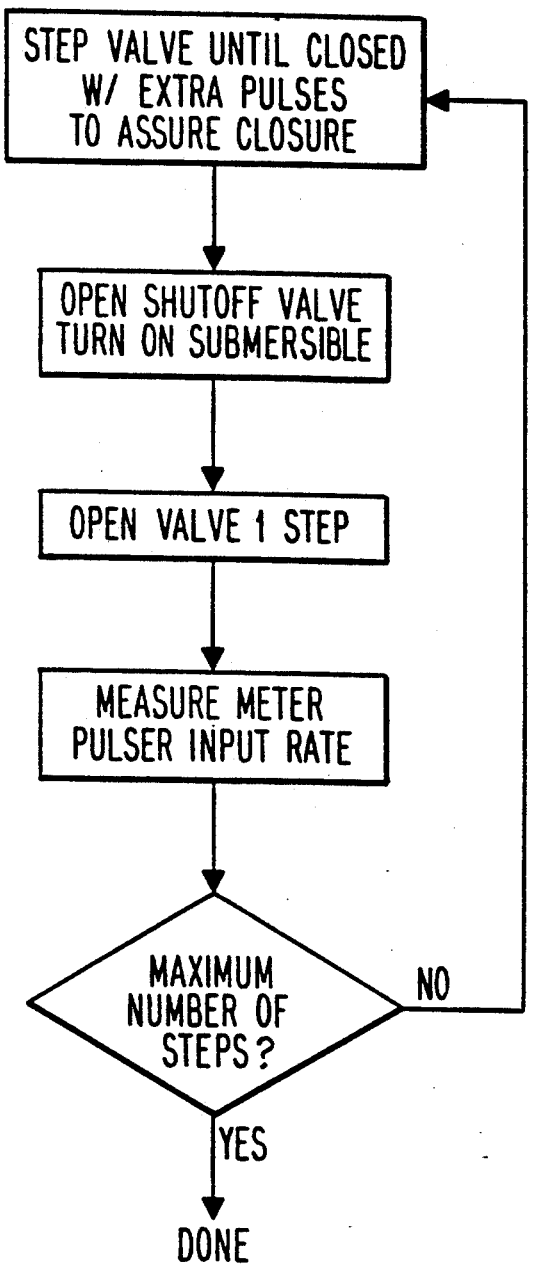
FIG. 8 is a flow chart showing the calibration of the variable valve shown in FIG. 2.

In FIG. 8, the software for the calibration of the system is illustrated. In the initial step in the calibration procedure, the variable valves 24 and 26 are moved into the closed position with the closure 76 engaging the closure stop 81. In order to insure closure of the variable valves 24 and 26, the motor 68 is provided with a sufficient number of extra pulse signals to attempt rotation of the closure 76, at reduced torque, past the closure stop 81. In the second step, pulse signals are provided to open the shut-off valves and turn on the submersible pumps in order to initiate a flow of fluid into the system. Thereafter, each variable valve is opened one step in order to allow a flow of fluid passed the valve and into the meters. In the fourth step, the meters transmit to the valve control 10 pulser signals relating to the flow of fluid in relation to the valve opening at one step. Following this fourth step, the calibration operation is again repeated until a maximum number of steps for the valves are calibrated.

As previously indicated in FIG. 1, activation of the particular blend selection switch corresponds with a particular grade of gasoline to be dispensed from the system. The valve control 10 processes a blend ratio associated with the blend selection switch and transmits a blend ratio signal, via lines 64 and 66, respectively, to adjust each of the variable valves 24 and 26. Accordingly, the blend ratio is indicative of a ratio of the volume of first fluid to volume of second fluid which is to be dispensed from the system.

As previously indicated, the rom 53 stores data, and communicates the data via line 49, relating to the residual fluid remaining in the hollow outlet delivery hose 48. The outlet delivery hose 48 retains an amount of fluid from the preceeding transaction (perhaps ¼ of a gallon) which is dispensed with the current transaction. Accordingly, the valve control 10 produces a residual blend ratio signal relating to the ratio of volume of low octane gasoline to high octane gasoline associated with the previous blend contained in the hollow outlet delivery hose 48. The residual blend ratio signal is transmitted via lines 64 and 66 for adjusting the variable valves 24 and 26 to correct the initial flow for the next transaction in order to obtain the desired blend.

As illustrated in FIG. 1, the blend and flow control of the present invention is provided by the variable valves 24 and 26, meters 30 and 34, and valve control 10. The lines 64 and 66 provide the stepper motor drive control signals based on the blend ratio and residual blend ratio for setting the volumes of first and second fluids to be dispensed from the system. The lines 56 and 58 carry the pulser signals relating to the actual volumes of first and second fluids which pass through the meters 30 and 34.

The illustrated blend control is derived from relating a ratio of the total actual volumes of first fluid to second fluid (the ratio of total flow rate signals provided from the first and second meters 30, 34, respectively) against a desired volume ratio of first fluid to second fluid. Accordingly, the valve control 10 processes at each adjustment the number of pulses expected for each side based upon the blend ratio and the total number of pulses to obtain the desired flow rate signals. The difference between the desired first and second flow rate signals and actual first and second flow rate signals is the amount of adjustment necessary to maintain the blend. In a presently preferred embodiment, the blend adjustments are calculated relative to side A (the valve producing the lesser percentage of fluid) if the blend is lesser than or equal to one half, and relative to side B (the valve producing the greater percentage of fluid) if the blend is greater than or equal to one half. For example, the number of pulses expected for side A equals the total pulses multiplied by the blend ratio, and the number of pulses except for side B equals the total pulses minus side A. The error in the blend of side A is calculated by subtracting the actual pulse count from the desired pulse count. Accordingly, the adjustments to correct for the error are calculated by adding the error value to the difference in error multiplied by 4. The difference in error is calculated by subtracting the error last time from the error this time. This value is thereafter multiplied by a scale and then divided by 4096 to obtain the necessary adjustment for the valve. The scale value equals 1024 (400 H) when not in fast flow. When in fast flow, 2 is subtracted from the 1024 scale value every adjustment (every 15 pulses) until reaching 336 (150 H). Note that the error in blend in relation to side B may be determined in the same manner.

As previously indicated, the pulse count between adjustment intervals is the flow rate value. In a presently preferred embodiment, various flow rates are produced by varying the adjustment interval between 5 and 15 pulses. The flow rate is regulated such that the time taken for X pulses equals the time taken for 5 pulses at the slow flow rate. For example, a flow rate of 15 is 3 times the slow flow rate, where 5 is slow flow and 15 is fast flow. The error in the flow rate is calculated by subtracting the time taken for 5 pulses at slow flow from the time taken for X pulses. Adjustments of the valves necessary in response to the error is calculated by adding the error value to the difference in error (error last time subtracted from the error this time) multiplied by 4, and then dividing this value by 8.

Figure 9:
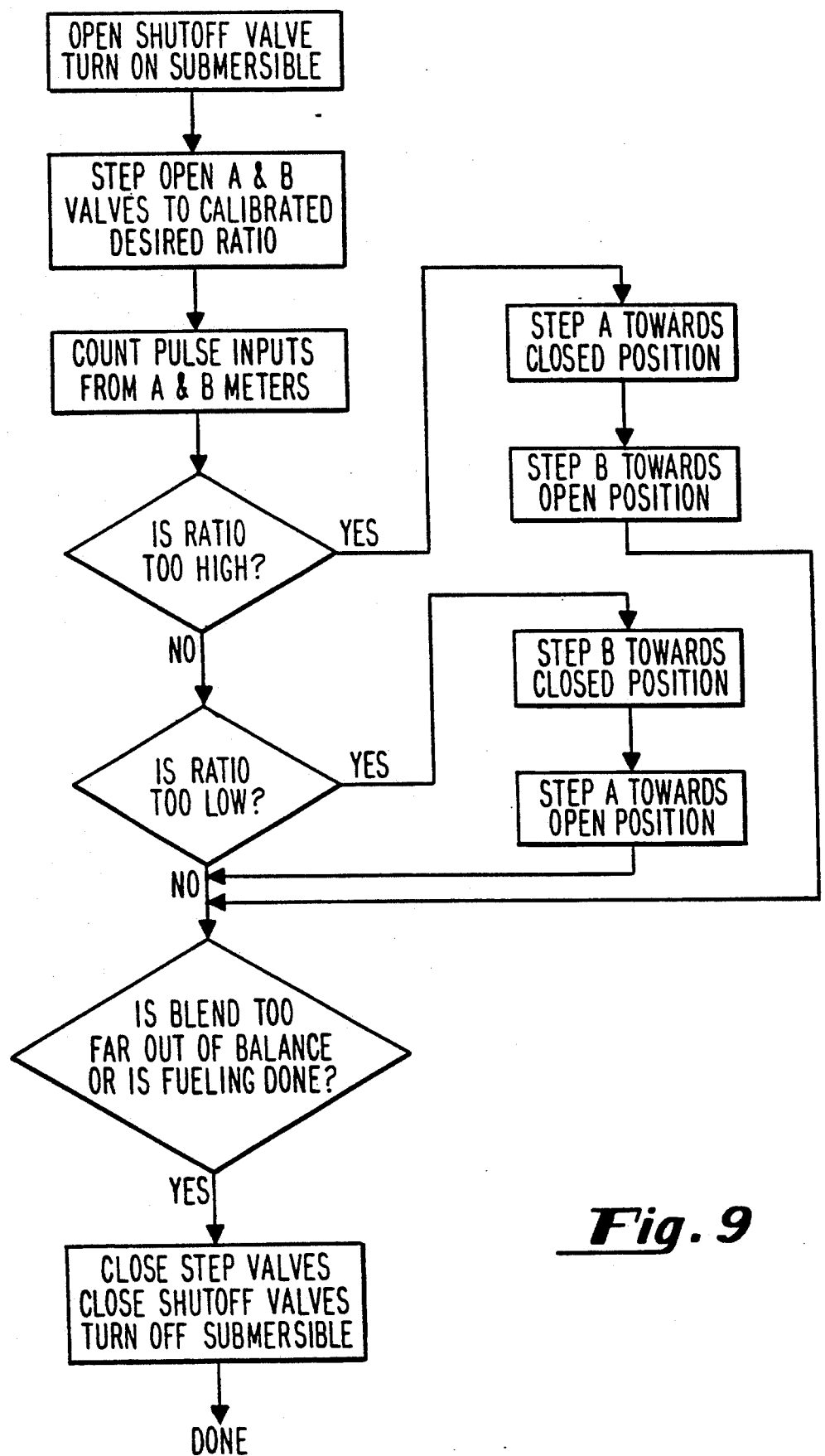
FIG. 9 is a flow chart showing the variable valve control according to the present invention.

In FIG. 9, the software for the blend and flow control is illustrated. In the first step, the valve control 10 transmits control pulses via lines 66 and 62, and 55 and 57 for opening the shut-off valves 40 and 42 and actuating the submersible pumps 16 and 18. In the second step, the variable valves 24 and 26 (indicated as valves A and B, respectfully) receive via lines 64 and 66 control pulses in order to open the variable valves 24 and 26 according to the desired blend ratio and residual blend ratio. During the third step, pulser signals are delivered via lines 56 and 58 in relation to the pulse count flowing through each meter. If the actual blend ratio is too high, side A is directed by valve control 10 to rotate towards the closed position and side B is directed by valve control 1- to rotate towards the open position. If the actual blend ratio is to low, the valve control 10 directs side B to rotate towards the closed position and side A to rotate towards the open position. In the final step, the valve control 10 transmits control pulses to close the variable valves 24 and 26, close the shut-off valves 40 and 42, and turn off the submersible pumps 16 and 18 after the fueling transaction is completed, or if the blend is to far off balance. In the presently preferred embodiment, the valve control 10 will terminate the transaction following 20 consecutive adjustments (about 0.3 gallons) where the error continues to get increasingly worse. As previously indicated, a transaction is completed when the total volume of first fluid to second fluid reaches an estimated valve.

The valve control 10 processes a number of system variables to lower heat dissipation for the valves 24 and 26. Accordingly, when the motor is not functioning, the valve control 10 generates lower holding torque and lower heat dissipation by driving the motor 1 millisecond and resting 7 milliseconds. Further, to preserve wear on the valve stop, the valve control 10 generates reduced holding torque when the valve control 10 estimates the valves 24 and 26 reach the closure stop 81. In addition, the valve control 10 will not open either of the valves 24, 26 greater than 180° (100 steps). Finally, when the pumps 16, 18 are idle, the valve control 10 will not drive either of the motors 68 at all.

It will be recognized by those skilled in the art that changes may be made to the above-described embodiments of the invention without departing from the broad inventive concepts thereof. It is understood, therefore, that this invention is not limited to the particular embodiments disclosed, but it is intended to cover all modifications which are within the scope and spirit of the invention as defined by the appended claims.

We claim:

1. A gasoline blending and dispensing system for delivery of a predetermined blended mixture of low and high octane gasoline representing a particular blend of gasoline received from respective low and high octane gasoline supply sources comprising:

first and second valve means for regulating the flows of low and high octane gasoline from the respective low and high octane gasoline supply sources in response to first and second control signals, first and second meter means generating first and second flow rate signals corresponding to rates of flow of the respective low and high octane gasoline representing an actual blended mixture of low and high octane gasoline to be dispensed from the system, dispensing means including a hollow delivery hose for receiving the flows of low and high octane gasoline for dispensing from the system, the hollow delivery hose containing a previous blended mixture of low and high octane gasoline prior to receiving the flow of low and high octane gasoline, means for producing a blend ratio signal indicative of a desired blended mixture of low and high octane gasoline to be dispensed from the system, means for producing a residual blend ratio signal indicative of the previous blended mixture of low and high octane gasoline contained within the hollow delivery hose, valve control means responsive to the blend ratio signal, the residual blend ratio signal and the first and second flow rate signals for producing the first and second control signals for adjusting the first and second valve means to regulate the flows of the low and high octaine gasoline for compensating for the previous blended mixture of low and high octane gasoline contained within the hollow delivery hose and the actual blended mixture of low and high octane gasoline when in variation of the desired blended mixture of low and high octane gasoline for dispensing the predetermined blended mixture of low and high octane gasoline from the system, and wherein the first and second valve means each comprise:

a valve housing, the valve housing having an opening extending axially therethrough from an upper end thereof to a valve base, a motor means responsive to the control signals provided from the valve control means, an elongated shaft associated with and operatively driven by the motor means extending axially downward through the opening of the valve housing for rotational movement in response to the control signals received by the motor means, a closure mounted to the elongated shaft for rotational movement with rotation of the elongated shaft, the valve base having an inlet cavity formed therethrough for receiving a flow of fluid and an orifice formed therethrough adjacent the inlet cavity for discharging a flow of fluid, whereby the fluid flow is directed through the inlet cavity into the opening of the valve housing and out through the orifice, the closure being rotatable against the valve base and over the orifice in response to the control signals produced by the valve control means for regulating the flow of fluid.

2. The blending and dispensing system of claim 1, further comprising first and second pumping means responsive to a pump control signal produced by the valve control means for controlling the delivery of the low and high octane gasoline from the respective low and high octane gasoline supply sources.

3. The blending and dispensing system of claim 1, further comprising first and second shut-off valve means responsive to a shut-off valve control signal produced by the valve control means for controlling the passage of the respective low and high octane gasolines.

4. The blending and dispensing system of claim 1, further comprising:
means biasing the closure axially downward for maintaining engagement with an upper surface of the valve base, the biasing means being generally aligned with the orifice in the valve base when in the closed position of the valve.

5. The blending and dispensing system of claim 1, wherein the valve control means includes:
means responsive to the first and second flow rate signals, the blend ratio signal and the residual blend ratio signal for calculating a desired first and second flow rate signals, and
means responsive to the difference between the desired first and second flow rate signals and the first and second flow rate signals for producing the first and second control signals for adjusting the first and second valve means.

6. The blending and dispensing system of claim 1, wherein the valve control means includes transaction initiation means responsive to the blend ratio signal for delivering the flow of low and high octane gasoline from the respective low and high octane gasoline supply sources to the dispensing means.

7. The blending and dispensing system of claim 1, wherein the valve control means includes transaction termination means responsive to the blend ratio signal and the first and second flow rate signals for terminating the flow of the low and high octane gasoline from the respective low and high octane gasoline supply sources to the dispensing means.

8. The valve of claim 1, wherein the closure comprises a generally flat member slidably movable relative to the valve base, the closure being of sufficient size to completely cover the orifice in the closed position of the valve.

9. A blending and dispensing system for delivery of a predetermined blended mixture of first and second fluids, comprising:
means for providing a flow of the first fluid,
means for providing a flow of the second fluid,
means for providing a first flow rate signal in response to the rate of flow of the first fluid,
means for providing a second flow rate signal in response to the rate of flow of the second fluid,
valve control means responsive to the first and second flow rate signals for providing first and second control signals,
first and second valve means responsive to the first and second control signals for regulating the flows of the respective first and second fluids, each of the valve means comprising:
a valve housing, the valve housing having an opening extending axially therethrough from an upper end thereof to a valve base,
a motor means responsive to the control signals provided from the valve control means,
an elongated shaft associated with and operatively driven by the motor means extending axially downward through the opening of the valve housing for rotational movement in response to the control signals received by the motor means,
a closure mounted to the elongated shaft for rotational movement with rotation of the elongated shaft,
the valve base having an inlet cavity formed therethrough for receiving a flow of fluid and an orifice formed therethrough adjacent the inlet cavity for discharging a flow of fluid whereby the fluid flow is directed through the inlet cavity into the opening of the valve housing and out through the orifice, the closure being rotatable against the valve base, and over the orifice in response to the control signals produced by the valve control means for regulating the flow of fluid.

10. The blending and dispensing system of claim 9, further comprising:
means biasing the closure axially downward for maintaining engagement with an upper surface of the valve base, the biasing means being generally aligned with the orifice in the valve base when in the closed position of the valve.

11. The blending and dispensing system of claim 9, further comprising:
dispensing means including a hollow delivery hose for receiving the flow of first and second fluids for dispensing from the system, the hollow delivery hose containing a previous blended mixture of first and second fluid prior to receiving the flow of the first and second fluid,
means for producing a residual blend ratio signal indicative of the previous blended mixture of first and second fluid contained within the hollow delivery hose,
means for producing a blend ratio signal indicative of a desired blended mixture of first and second fluid to be dispensed from the system,
the valve control means responsive to the blend ratio signal, the residual blend ratio signal and the first and second flow rate signals for producing the first and second control signals for adjusting the first and second valve means to regulate the flow of the first and second fluids.

12. The blending and dispensing system of claim 11, wherein the valve control means includes:
means responsive to the first and second flow rate signals, the blend ratio signal and the residual blend ratio signal for calculating a desired first and second flow rate signals,
means responsive to the difference between the desired first and second flow rate signals and the first and second flow rate signals for producing the first and second control signals for adjusting the first and second valve means.

13. The valve of claim 9, wherein the closure comprises a generally flat member slidably movable relative to the valve base, the closure being of sufficient size to completely cover the orifice in the closed position of the valve.

14. A gasoline blending and dispensing system for delivery of a predetermined blended mixture of low and high octane gasoline representing a particular blend of gasoline received from respective low and high octane gasoline supply sources, comprising:

first and second meter means generating first and second flow rate signals corresponding to rates of flow of the respective low and high octane gasoline representing an actual blended mixture of low and high octane gasoline to be dispensed from the system, dispensing means including a hollow delivery hose for receiving the flows of low and high octane gasoline for dispensing from the system, the hollow delivery hose containing a previous blended mixture of low and high octane gasoline prior to receiving the flow of low and high octane gasoline, means for producing a blend ratio signal indicative of a desired blended mixture of low and high octane gasoline to be dispensed from the system, means for producing a residual blend ratio signal indicative of the previous blended mixture of low and high octane gasoline contained within the hollow delivery hose, valve control means responsive to the blend ratio signal, the residual blend ratio signal and the first and second flow rate signals for producing first and second control signals, and first and second valve means responsive to the first and second control signals for regulating the flows of low and high octane gasoline from the respective low and high octane gasoline supply sources for compensating for the previous blended mixture of low and high octane gasoline contained with the hollow delivery hose and the actual blended mixture of low and high octane gasoline when in variation of the desired blended mixture of low and high octane gasoline for dispensing the predetermined blended mixture of low and high octane gasoline from the system, each of the first and second valve means comprising:

a valve housing, the valve housing having an opening extending axially therethrough from an upper end thereof to a valve base, a motor means responsive to the control signals provided from the valve control means, an elongated shaft associated with and operatively driven by the motor means extending axially downward through the opening of the valve housing for rotational movement in response to the control signals received by the motor means, a closure mounted to the elongated shaft for rotational movement with rotation of the elongated shaft, the valve base having an inlet cavity formed therethrough for receiving a flow of fluid and an orifice formed therethrough adjacent the inlet cavity for discharging a flow of fluid whereby the fluid flow is directed through the inlet cavity into the opening of the valve housing and out through the orifice, the closure being rotatable against the valve base, and over the orifice in response to the control signals produced by the valve control means for regulating the flow of fluid.

15. The blending and dispensing system of claim 14, further comprising:

means biasing the closure axially downward for maintaining engagement with an upper surface of the valve base, the biasing means being generally aligned with the orifice in the valve base when in the closed position of the valve.

16. The blending and dispensing system of claim 14, further comprising first and second pumping means responsive to a pump control signal produced by the valve control means for controlling the delivery of the low and high octane gasoline from the respective low and high octane gasoline supply sources.

17. The blending and dispensing system of claim 14, further comprising first and second shut-off valve means responsive to a shut-off valve control signal produced by the valve control means for controlling the passage of the respective low and high octane gasolines.

18. The blending and dispensing system of claim 14, wherein the valve control means includes:

means responsive to the first and second flow rate signals, the blend ratio signal and the residual blend ratio signal for calculating a desired first and second flow rate signals, and means responsive to the difference between the desired first and second flow rate signals and the first and second flow rate signals for producing the first and second control signals for adjusting the first and second valve means.

19. The blending and dispensing system of claim 14, wherein the valve control means includes transaction initiation means responsive to the blend ratio signal for delivering the flow of the low and high octane gasoline from the respective low and high octane gasoline supply sources to the dispensing means.

20. The blending and dispensing system of claim 14, wherein the valve control means includes transaction termination means responsive to the blend ratio signal and the first and second flow rate signals for terminating the flow of the low and high octane gasoline from the respective low and high octane gasoline supply sources to the dispensing means.

21. The valve of claim 14, wherein the closure comprises a generally flat member slidably movable relative to the valve base, the closure being of sufficient size to completely cover the orifice in the closed position of the valve.

22. A valve for use in a gasoline blending and dispensing system for regulating a flow of gasoline in response to control signals, comprising:

a valve housing, the valve housing having an opening extending axially therethrough from an upper end thereof to a valve base.

a motor means responsive to the control signals provided from the valve control means, an elongated shaft associated with and operatively driven by the motor means extending axially downward through the opening of the valve housing for rotational movement in response to the control signals received by the motor means, a closure mounted to the elongated shaft for rotational movement with rotation of the elongated shaft, the valve base having an inlet cavity formed therethrough for receiving a flow of fluid and an orifice formed therethrough adjacent the inlet cavity for discharging a flow of fluid whereby the fluid flow is directed through the inlet cavity into the opening of the valve housing and out through the orifice, the closure being rotatable against the valve base, and over the orifice in response to the control signals produced by the valve control means for regulating the flow of fluid.

23. The valve of claim 22, wherein the valve base further comprises:
 a closure stop extending axially outward from the upper surface of the valve base for limiting the clockwise and counterclockwise rotation of the closure.

24. The valve of claim 22, wherein the closure comprises a generally flat member slidably movable relative to the valve base, the closure being of sufficient size to completely cover the orifice in the closed position of the valve for preventing the flow of fluid therethrough.

25. The valve of claim 24, wherein the orifice comprises an arcuate opening in a generally flat plate.

26. The valve of claim 22, further comprising:
 a connecting member associated with and extending outwardly from the elongated shaft generally parallel the closure for mounting of the closure to the elongated shaft.

27. The valve of claim 25, wherein the closure is movably connected to the connecting member.

28. The valve of claim 25, further comprising:
 means biasing the closure axially downward for maintaining engagement with an upper surface of the valve base, the biasing means being positioned between the connecting member and the closure and generally aligned with the orifice in the valve base when in the closed position of the valve.

* * * * *

UNITED STATES PATENT AND TRADEMARK OFFICE
CERTIFICATE OF CORRECTION

PATENT NO. : 5,257,720
DATED : November 2, 1993
INVENTOR(S) : Stanley S. Wulc, et al.

It is certified that error appears in the above-indentified patent and that said Letters Patent is hereby corrected as shown below:

Column 1, line 29 after "blending cycle" and before "In addition" should have inserted --.--.

Column 7, line 40 "valve control 1" should be --valve control 10--.

Column 14, line 8 "25" should be --26--.

Signed and Sealed this

Tenth Day of May, 1994

Attest:

BRUCE LEHMAN

Attesting Officer     Commissioner of Patents and Trademarks